United States Patent [19]

Defosse et al.

[11] Patent Number: 4,956,738

[45] Date of Patent: Sep. 11, 1990

[54] VERY HIGH SPEED CIRCUIT BREAKER ASSISTED BY SEMICONDUCTORS

[75] Inventors: Georges Defosse, Barchon; Henri Bonhomme, Ans; Rene Lesceux, Alleur, all of Belgium

[73] Assignee: (ACEC) Ateliers De Constructions Electriques De Charleroi, Brussels, Belgium

[21] Appl. No.: 785,398

[22] Filed: Oct. 8, 1985

[30] Foreign Application Priority Data

Oct. 12, 1984 [EP] European Pat. Off. ........ 84201469.8

[51] Int. Cl.[5] ................ H02H 7/22

[52] U.S. Cl. ................ 361/8; 361/3; 335/71

[58] Field of Search ................ 361/2–8, 361/13; 335/71, 75, 76, 253, 257

[56] References Cited

U.S. PATENT DOCUMENTS

| | | | |
|---|---|---|---|
| 2,540,466 | 2/1951 | Welch | 361/13 X |
| 3,023,291 | 2/1962 | Soles et al. | 361/8 X |
| 3,215,797 | 11/1965 | Kesselring et al. | 361/5 X |
| 3,372,288 | 3/1968 | Wigington | 361/6 X |
| 3,515,940 | 6/1970 | Hobson, Jr. | 361/6 X |
| 3,588,605 | 6/1971 | Casson | 361/13 |
| 3,646,295 | 2/1972 | Circle | 361/8 X |
| 3,723,922 | 3/1973 | Loewen | 335/68 |
| 3,737,724 | 6/1973 | Salge et al. | 361/8 |
| 3,764,944 | 10/1973 | Erven | 335/2 |
| 3,921,038 | 11/1975 | Kernick et al. | 361/7 X |
| 4,172,268 | 10/1979 | Yanabu et al. | 361/84 |
| 4,568,995 | 2/1986 | Mushenski | 361/13 X |
| 4,626,951 | 12/1986 | Nagao | 361/2 X |

*Primary Examiner*—William M. Shoop, Jr.
*Assistant Examiner*—A. Jonathan Wysocki
*Attorney, Agent, or Firm*—Foley & Lardner, Schwartz, Jeffery, Schwaab, Mack, Blumenthal & Evans

[57] ABSTRACT

The very fast circuit breaker assisted by semiconductor electronics. A piston 21 slides in an insulating housing 20 and along a center shaft 22. The piston 21 has of an exciting winding 25 and a magnetic yoke 26, which by cooperating with an armature 28, join the piston 21 to the center shaft 22, a shoulder of which renders possible the holding of a repulsion disk 34. The repulsion disk carries the moving contacts 35 and 36, which cooperate with the stationary contacts 37 and 38, when the piston is in its high position under the effect of a locking spring 24. Upon the injection of a current into the repulsion coil 45, the repulsion disk 34 is violently repulsed in the downward direction, while jumping the electromagnetic lock established between the magnetic yoke 26 and the armature 28. An admission of compressed air through an orifice 27 permits the descent of the piston 21.

14 Claims, 4 Drawing Sheets

VERY HIGH SPEED CIRCUIT BREAKER ASSISTED BY SEMICONDUCTORS

BACKGROUND OF THE INVENTION

The invention relates to a current-limiting high speed circuit breaker to be used with intermediate voltages and more particularly adapted to direct current electric traction in rolling or stationary equipment.

It is well known that direct current networks, both for traction and in industry, are becoming increasingly complex and powerful. It was necessary to design switching equipment to disconnect currents of ever increasing size and to reduce the cost of maintenance. New generation switchgear must be fast to limit the current and to reduce mechanical and thermal stresses on the entire installation and to reduce wear on its contacts and its spark blow-out chamber. At the present time, switchgear in traction networks comprise very high speed mechanisms to open the contacts and a spark blow-out chamber in which the arc created is confined and cooled. This equipment requires significant expenditures for maintenance and replacing pieces subject to wear.

Various combination of the mechanisms and semiconductors have been proposed but, to our knowledge, none of these has resulted in an industrial application in direct current within the voltage range of interest here, i.e. an the order of 4000 Volts.

The apparatus according to the invention eliminates the aforementioned disadvantages by avoiding the formation of a significant arc by means of the complementary use of semiconductors and of a specific, much more rapid mechanism, referred to hereinafter as a very high speed mechanism.

U.S. Pat. Nos. 3,723,922 and 3,764,944 describe a mechanism intended for a synchronous switchgear apparatus in an alternating network, in which the axial displacement of a disk connected with a mobile contact bridge by means of a center shaft is obtained by repulsion with the aid of helical coils excited by a high current originating in the discharge of a capacitor specifically provided for the purpose. This apparatus, designed for a high voltage alternating current, operates under a high vacuum. It uses exciting coils of a complex manufacture and special devices for the deceleration of the center shaft.

SUMMARY OF THE INVENTION

In the apparatus according to our invention, circuit breaking, without a significant arc, is obtained by the addition of an oscillating circuit controlled by semiconductors and the induction coil of which is employed as a repulsion coil, an electromagnetically held very high speed mechanism wherein the same element acts simultaneously as the repulsion disk and the mobile contact bridge.

The mechanism is combined according to the invention with an oscillating circuit by means of power semiconductors and comprises specifically:

a helical repulsion coil, embedded in an insulating mass and acting as the induction coil of the oscillating circuit, a mobile assembly with an alternating motion, a permanent magnet or a holding winding and a magnetic yoke inserted in said mobile assembly, an armature cooperating with the magnetic yoke in conjunction with the disk.

The invention is characterized by the fact that the separation of the contacts is obtained without a significant delay upon the appearance of the repulsion force. This repulsion force grows very rapidly without the need for the storage or large amounts of energy in the mechanical form (for example the deformation of springs or the pressuring of a fluid). This absence of the storage of energy in the mechanical form, intended solely for the acceleration of moving parts, leads to an important reduction in the dimensions of the apparatus.

In circuit breaker devices the important parameters are the opening time lag and the opening velocity. The opening time lag is defined as the period of time elapsing between the onset of the command to open and the instant wherein the moving contacts commence to move away from the stationary contacts.

The opening velocity must be high primarily at the start of the course in order to rapidly attain a sufficient distance.

In view of the current level of performance of semiconductors, the combination of a mechanism and an oscillating circuit is of interest only if a mechanism is available that is capable of achieving certain operating times of which are of an order of magnitude comparable to those of current power semiconductors.

The circuit breaker according to the invention combines the advantage of a simple configuration with that of an opening time improved to the point where it attains these orders of magnitude. The improvement of opening times is obtained in particular by an ogive of the opposing current controlling the opening of the moving contacts without any preparation sequence. It is described in more detail with the aid of the following figures:

BRIEF DESCRIPTION OF THE DRAWINGS

FIG. 1 shows the diagram used according to the invention.

DETAILED DESCRIPTION OF THE PREFERRED EMBODIMENTS

Figure 1:
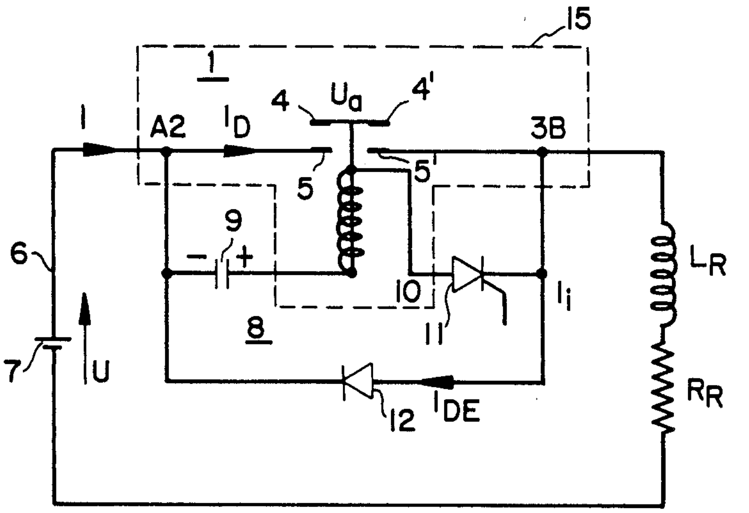
FIG. 1 shows an example of a circuit diagram of a continuous current circuit breaker according to the invention.

A switchgear apparatus 1 is represented by an inlet terminal 2 located at A, an outlet terminal 3 located at B, a mobile contact bridge 4,4' and stationary contacts 5,5'. This apparatus is mounted in an external circuit 6 represented by the elements designated $L_R$ and $R_R$ and supplied by a source of voltage U shown at 7. Between the terminals 2 and 3 of the circuit breaker 1 the component elements of an auxiliary circuit 8 are arranged.

Figure 2:
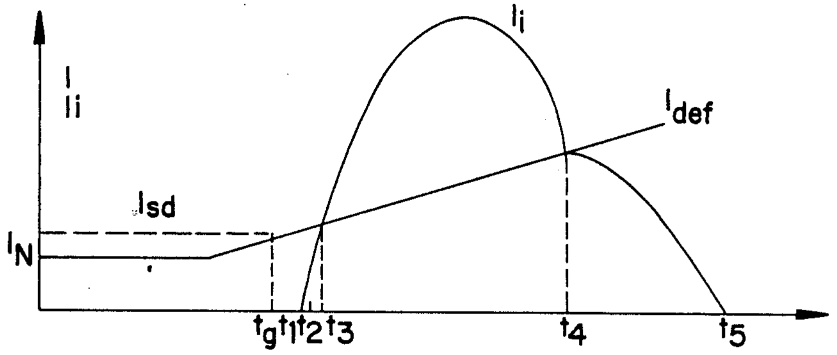
FIG. 2 illustrates the operation of this type of circuit breaker.

The auxiliary circuit 8 is an oscillating circuit comprising a capacitor 9, an induction coil 10 and the semiconductors 11 and 12. The discharge of the capacitor 9 of the auxiliary circuit corresponds to the injection of an ogive of a current circulating in a direction opposite to that of the current to be interrupted. The operation of this new generation of circuit breakers designated very high speed and shown in FIG. 1, is illustrated by the form of the waves of FIG. 2.

At the instant $t_o$ the defect current $I_{def}$ attains the value of the breaking threshold $I_{sd}$.

At the instant $t_1$, following a delay inherent in the electronics, the thyristor 11 is actuated by a detection system, not shown, placed in the principal circuit 6.

A surge of the current $I_i$ is generated in the circuit formed by the capacitor 9, the induction coil 10, which according to the invention serves as the repulsion coil, the thyristor 11, the stationary contacts 5,5' and the mobile contact bridge 4,4'. This surge of the current $I_i$ of several thousand amperes passes through the induction coil 10 and induces in the disk forming the mobile contact bridge 4,4' currents such that the disk is violently repulsed assisted by semiconductor electronics by the induction coil 10.

Beginning at the instant $t_1$, the current from the stationary contacts 5,5' begins to decrease. At the instant $t_2$, when the repulsing force has become sufficient, the contact bridge 4,4' opens.

At the instant $t_3$ the ogive of the current $I_i$ crosses the curve of the defect current $I_D$, the current $I_{def}$ passes to zero and is interrupted. The excess of the surge of the current $I_i$ then finds a path of less impedance through the diode 12.

Beginning at the instant $t_4$, the current $I_{DE}$ in the diode 12 is cancelled. At the instant $t_5$ the defect current $I_{def}$ is cancelled, thereby marking the attainment of the circuit breaking process.

Figure 3:
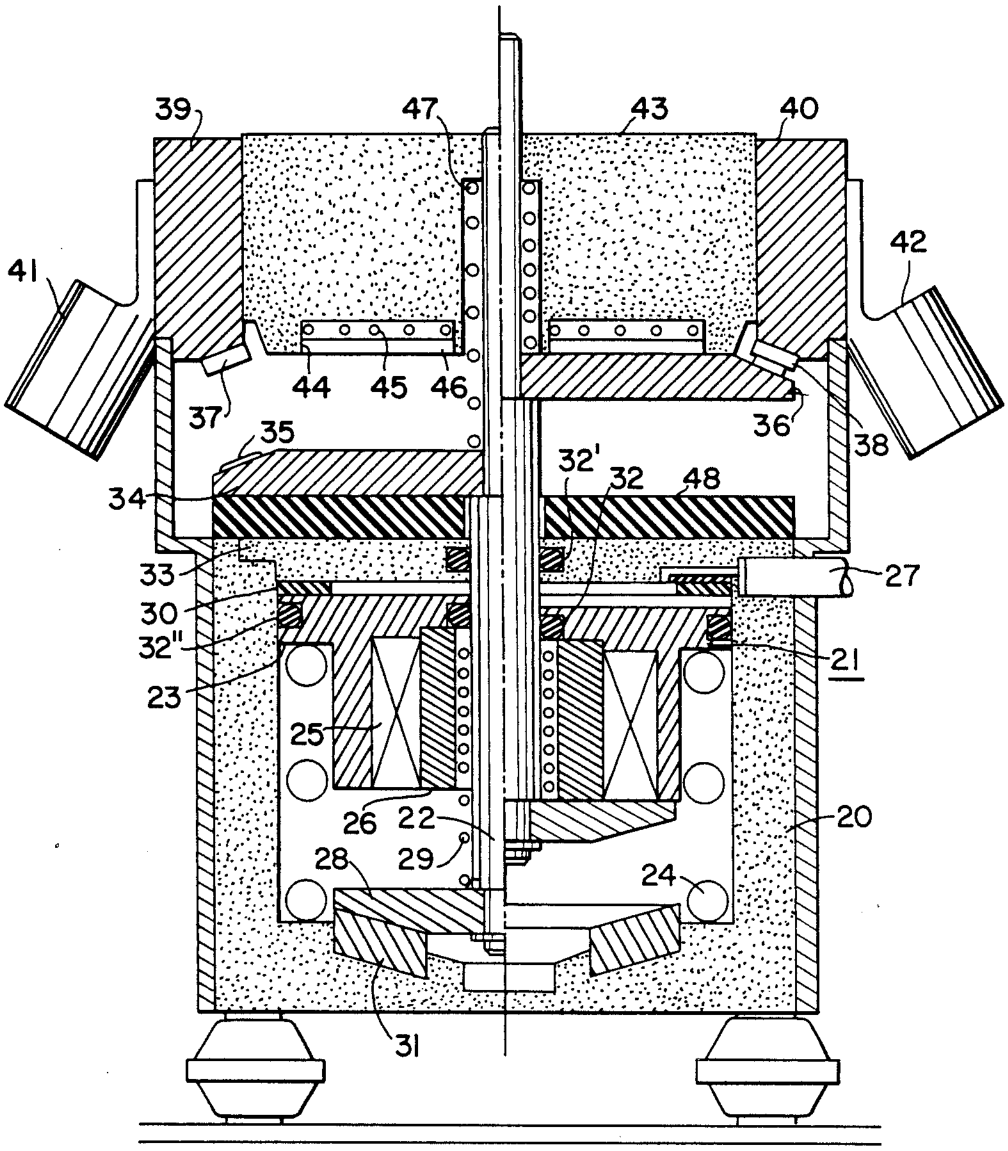
FIG. 3 is a view in section of a first example of an embodiment of the mechanism used according to the invention.

It should be noted that in this design the induction coil 10 of the auxiliary circuit shown in FIG. 1 is integrated entirely or in part in the apparatus and that the thyristor 11 is actuated when the defect circuit $I_{def}$ attains the value of the breaking threshold $I_{sd}$. However, for purposes of illustration, only the portion designated by reference numeral 15 in FIG. 1 is shown in FIG. 3.

Figure 6:
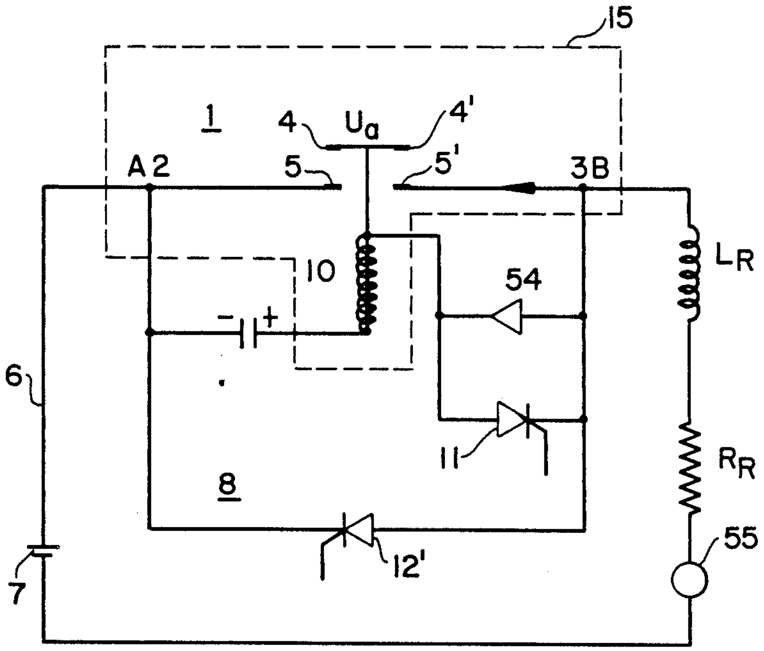
FIG. 6 shows an example of the fundamental diagram of the circuit breaker used as a bidirectional element.

The fact that the current surge is produced by an oscillating circuit makes it possible for the circuit breaker 1 to be bidirectional, i.e. that it may be used by a current circulating from left to right as shown in FIG. 1 or for a current circulating in both directions according to the circuit diagram of FIG. 6. In this novel generation of equipment, a first necessary condition is to obtain an adequately short opening time lag. In effect, it may be seen in FIG. 2 that the longer the opening delay, the larger the current to be disconnected will be.

A second necessary condition is to obtain a high opening velocity. The higher the opening velocity, the more rapidly the inter-electrode space will recover sufficient dielectric rigidity, capable of supporting the rise in voltage between A and B, when the capacitor 9 is recharged. On the other hand, the longer the period of time during which the diode 12 must conduct, the larger the capacitor 9 must be.

A third necessary condition is that the contact opening phase and the sending of the opposing current remain in synchronization during the entire life of the apparatus. FIG. 3 shows the very high speed circuit breaker according to the invention.

In the example of embodiment described, this mechanism comprises a cylindrical insulating housing 20, inside of which a piston 21 guided at its center by a shaft 22, is sliding. The piston 21 is provided with a peripheral shoulder 23 serving as the seat for a spring to be designated later the locking spring 24, the other end whereof is resting on the bottom of the insulating housing 20.

The piston 21 is equipped with an excitation winding designated the holding coil 25, said coil being concentric with a magnetic yoke 26 with which it is cooperating.

The piston 21, which normally in its high position under the action of the locking spring 24, may be forced toward the bottom by the action of compressed air admitted at the top of the insulating housing through an orifice 27. The center shaft 22 carries at its lower end an armature 28 cooperating in a mode of operation to be described later, with the magnetic yoke 26. A recess in the magnetic yoke 26 makes it possible to retain a spring designated the armature spring 29, to force back the armature 28 when the magnetic attraction ceases, due to the holding coil 25. The shock absorbers 30 attenuate the end of the upward travel of the piston 21 and other shock absorbers 31 attenuate the end of the downward travel of the armature 28. A gasket 32 insures tightness between the piston 21 and the center shaft 22, which is serving as a guide for the piston.

A second gasket 32' insures tightness between the center shaft 22 and a cover 33 covering the insulating housing 20. A third gasket 32" insures tightness between the piston 21 and the insulating housing 20 serving as the cylinder. The center shaft 22 comprises in its upper part a reduction in diameter which serves as a retaining shoulder for a disk designated the repulsion disk 34. The repulsion disk 34 is made of a light alloy. In this embodiment, the repulsion disk 34 has a diameter equal to that of the insulating housing 20 and is provided on its upper surface with a bezel onto which two contact elements designated 35 and 36, are placed; they are referred to as moving contacts 35 and 36.

The moving contacts 35 and 36 are diametrically opposed and are tightly joined to the repulsion disk 34. The moving contacts 35 and 36 cooperate with the contact pellets at 37 and 38 and later designated the stationary contacts 37 and 38.

The stationary contacts 37 and 38 are respectively integral with an inlet terminal 39 and an outlet terminal 40.

According to the invention, the very high speed mechanism is further characterized by the fact that the repulsion disk 34 also serves as the contact bridge between the stationary contacts 37 and 38.

The two terminals 39 and 40 carry the lugs 41 and 42 to connect the cables of the principal circuit.

The terminals 39 and 40 are attached to the insulating housing 20 by elements shown schematically.

Between the terminals 39 and 40 an insulating mass 43 is placed, said mass being traversed at its center by the end of the center shaft 22. The lower surface of the insulating mass 43 comprises a cavity 44 into which a helical coil, designated the repulsion coil 45, is inserted. This repulsion coil 45 is joined to the insulating mass 43 by an impregnating resin forming an insulating layer 46. The insulating mass 43 is penetrated by a center hole permitting the center shaft 22 to extend to the outside and comprises a cavity housing a spring designated the disk spring 47, serving to maintain the repulsion disk in its low position.

A shock absorber 48 attenuates the end of the travel of the repulsion disk 34 toward the bottom.

The very high speed mechanism shown in FIG. 3 as an embodiment of the invention operates in the following manner.

At the onset, assume that the contacts are open. This position corresponds to the left hand side of FIG. 3, showing the moving contact 35 spaced apart from the stationary contact 37.

The entry of compressed air in the upper part of the insulating housing 20 through the orifice 27 forces the piston 21 to descend while compressing the locking spring 24 and the armature spring 29.

At the end of the travel of the piston 21 the magnetic yoke 26 enters into contact with the armature 28. By exciting the holding coil 25, the armature 28 is joined electromagnetically to the magnetic yoke 26.

By reducing progressively the pressure of the compressed air in the upper part of the insulating housing 20, the locking spring 24 is enabled to force the piston upward at a controlled rate. The electromagnetic lock existing between the armature 28 and the magnetic yoke 26 as shown on the right hand side of FIG. 3 makes it possible for the center shaft 22, which is integral with the armature 28 to rise, while entraining the repulsion disk 34 in the upward direction. The moving contacts 35 and 36 abut against the stationary contacts 37, 38 and the repulsion disk 34 serves as a contact bridge. The very high speed mechanism is then in the closed state. The flow of the current passes successively through the lug 41, the inlet terminal 39 and its contact pellet designated the stationary contact 37, the contact element designated the moving contact 35, the repulsion disk 34 serving as the moving contact bridge, the contact element designated the moving contact 36, the contact pellet designated the stationary contact 38, the outlet terminal 40 and the lug 42, or inversely.

The locking operation is an operation performed without the employment of the phenomenon of electrodynamic repulsion. In contrast, the triggering operation is extraordinarily fast due to electrodynamic repulsion, which makes it possible to reduce the opening time by another order of magnitude. The repulsing force is sudden and violent. It represents a veritable "hammer blow" which makes the electromagnetic lock established between the magnetic yoke 26 and the armature 28 jump.

In effect, the repulsion force is of a much higher order of magnitude than that of the electromagnetic holding force.

It should be noted that in the embodiment of the invention shown in FIG. 3 and in contrast to other configurations known at the present time, the electrodynamic repulsion utilizes essentially the current originating in the discharge of the capacitor of the auxiliary circuit.

Different layouts may be conceived of, wherein the action of the discharge current of the capacitor is combined with the action of the passing current in the principal circuit to reinforce the electrodynamic repulsion. The repulsing force corresponds to a significant acceleration at the onset of the movement of the repulsion disk 34, making it possible for the latter to rapidly move apart the moving contacts 35 and 36 from the stationary contacts 37 and 38.

Subsequently, the moving away of the repulsion disk 34 reducees the repulsing force, which contributes to the prevention of a further increase in the moving velocity of the repulsion disk and to the reduction of the impact of the repulsion disk 34 on the shock absorber 48.

In the embodiment of FIG. 3, the shock absorber 48 is represented simply by a layer of a deformable material. It is evident that this shock absorber may be of a more elaborate configuration. There may be further examples of the embodiment according to the invention. A first variant of the embodiment shown in FIG. 3 consists of integrating the repulsion disk 34 with the center shaft 22 and to make the stationary contacts 37 and 38 telescopic by a conventional combination of springs insuring the mobility of the contacts 37 and 38 and of plaiting, assuring conductivity from the contacts 37 and 38 to the lugs 41 and 42. This layout permits an adaptation of the repulsion disk 34 carrying the moving contacts 35 and 36 to the contacts 37 and 38 in case of an asymmetrical wear of the different contacts.

A second variant consists of placing the very fast mechanism shown in FIG. 3 in a tight enclosure containing a dielectric gas so as to favor the breaking phenomenon by an inter-electrode space of a higher dielectric rigidity.

Figure 4:
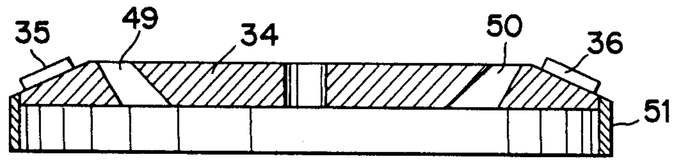
FIG. 4 shows a part of a second example of the embodiment.

A second example of the embodiment is shown in part in FIG. 4, where the repulsion disk 34 is provided with oblique holes 49,50 and a peripheral skirt 51. The peripheral skirt 51 has a dual function. It slows down the repulsion disk at the end of its run to prevent rebounding, and prevents the lateral escape of fluids when the repulsion disk is descending to apply at the outlet of the oblique holes 49 and 50 a vigorous blow to a potential arc.

Still another variant consists of inclining the stationary contacts 37, 38 and the moving contacts 35, 36 in a manner inverse to that shown in FIG. 3 and 4. According to this variant, the inclination of the contacts is effected so that the common interfaces are located on segments of straight lines, the imaginary intersection of which would be toward the bottom of the apparatus.

This layout makes it possible in particular to provide at the outlets of the oblique holes, such as those shown at 49 and 50 of FIG. 4, fluid jets directed so as to extinguish and cool potential arcs in an even more efficient manner.

Figure 5:
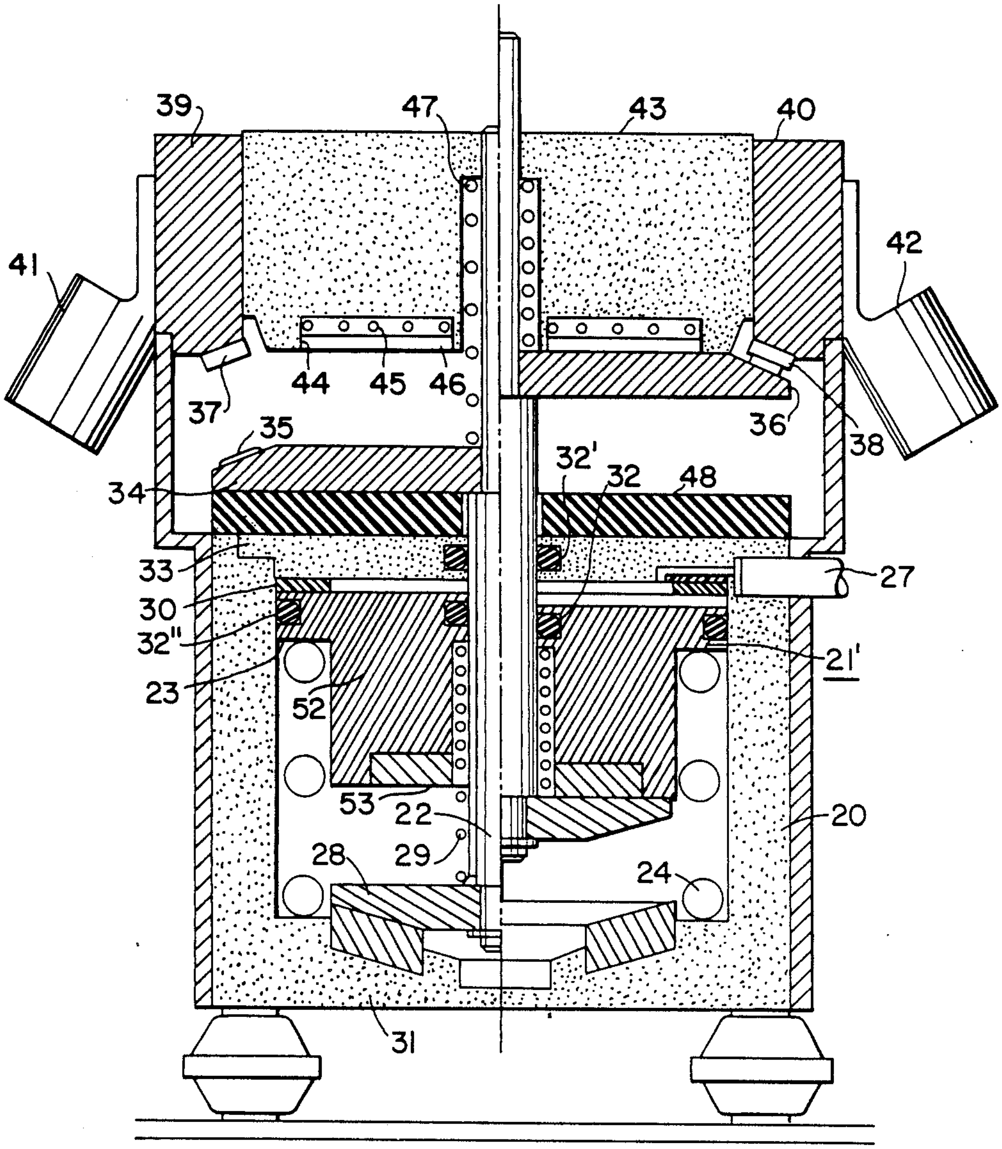
FIG. 5 is view in section of a third example of the embodiment of the mechanism used according to the invention.

FIG. 5 shows a third example of the mechanism, in which the piston 21 has been modified with respect to the first example shown in FIG. 3. This modified piston is designated 21'. The piston 21' retains roughly the same configuration and strictly insures the same functions as the piston 21 described in FIG. 3. Only the holding coil 25 and the magnetic yoke 26 are replaced by a permanent magnet 53 attached by known means to. The base of a piston body 52 the external diameter, unchanged with respect to FIG. 3, permits the sliding of the piston 21' inside the windings of the spring 24 and the center bore, unchanged with respect to FIG. 3, permits the sliding of the piston 21' along the windings of the armature spring 29.

FIG. 6 shows the circuit diagram used when the circuit breaker 1 is called upon to break the current regardless of its direction. The diagram of FIG. 6 differs from that of FIG. 1 by the presence of a countering electromotive force 55 in the principal circuit 6 and by the addition of a diode 54 mounted in the auxiliary circuit.

Let us assume that at an initial time, considered for an analysis of the sequence, the capacitor 9 is charged as indicated in FIG. 6, i.e. having a negative polarity at the terminal 2.

When the detection system recognizes the defect current $I_{def}$, it commands the gates of the thyristors 11 and 12'. The capacitor 9 discharges through a circuit consisting of the repulsion coil 10, the thyristor 11, the moving contacts 4,4' and the stationary contacts 5,5' not yet open, of the circuit breaker 1. Subsequently to the repulsion of the contact bridge 4,4' under the action of the repulsion coil 10, the surge of the current and the defect current pass through the thyristor 12'.

While the defect current passes into the principal circuit 6, the surge of the current oscillates sinusoidally in the auxiliary circuit; the capacitor 9 is charged with inverse polarity, i.e. with a positive polarity at the terminal 2. The thyristor 12' is then exposed to two opposing currents, at the one hand the defect current, directed from right to left in FIG. 6, which increases gradually, and on the other hand, the current surge, directed from left to right and rising suddenly until the current in the thyristor 12' is annuled. In view of the polarity of the of the capacitor 9, the thyristor 12' is blocked and the defect current passes through the diode 54 to recharge the capacitor 9 with its polarity again reversed, i.e. it is now negative at the terminal 2. The breaking sequence is complete.

We claim:

1. A circuit breaker connected in a principal circuit via an inlet terminal and an outlet terminal, comprising:
  - means for forming a mobile contact bridge between the inlet and outlet terminals,
  - means, connected to said mobile contact bridge means, for magnetically holding said mobile contact bridge means in contact with the inlet and outlet terminals; and
  - an auxiliary circuit connected across the inlet and outlet terminals and responsive to a defect current in the principal circuit for generating a surge of current opposing the defect current and for simultaneously applying an electrodynamic force to said mobile contact bridge means to overcome the magnetic hold and simultaneously separate said contact bridge means from the inlet and outlet terminals whereby a very fast circuit break in the principal circuit is formed.

2. A circuit breaker according to claim 1, wherein said means for forming a mobile contact bridge comprises:
  - a movable element, and
  - first and second contacts mounted on said movable element for making contact with contact surfaces of the inlet and outlet terminals, respectively.

3. A circuit breaker according to claim 2, wherein the contact surfaces of the inlet and outlet terminals are oriented obliquely with respect to the direction of displacement of said movable element when said electrodynamic force is applied.

4. A circuit breaker according to claim 3, wherein said movable element further includes a peripheral skirt, said movable element further having at least one pair of holes passing through said element.

5. A circuit breaker according to claim 2, wherein said movable element further includes at least one shock absorber mounted thereto for attenuating movement of said movable element when said electrodynamic force is applied.

6. A circuit breaker according to claim 1, wherein said magnetic holding means comprises:
  - a moving assembly connected to said mobile contact bridge means; and
  - a magnet assembly for holding said moving assembly via magnetic attraction so that said mobile contact bridge means is in contact with the inlet and outlet terminals.

7. A circuit breaker according to claim 6, wherein said moving assembly comprises:
  - a shaft connected on one end to said mobile contact bridge means; and
  - an armature integral with said shaft at the other end of said shaft.

8. A circuit breaker according to claim 7, wherein said magnet assembly comprises:
  - a piston disposed around said shaft; and
  - means integral with said piston and disposed around said shaft wherein said means is magnetically connected to said armature for holding said mobile contact bridge means in contact with the inlet and outlet terminals.

9. A circuit breaker according to claim 8, wherein said means integral with said piston is a permanent magnet.

10. A circuit breaker according to claim 8, wherein said means integral with said piston comprises:
  - an excitation coil; and
  - a magnetic yoke connected to said excitation coil.

11. A circuit breaker according to claim 8, further including a spring for maintaining said armature in a spaced-apart relationship from said means integral with said piston when said mobile contact bridge means is separated from the inlet and outlet terminals.

12. A circuit breaker according to claim 1, wherein said auxiliary circuit comprises:
  - a capacitor for generating a surge of a current circulating in a direction opposite to that of the defect current in the principal circuit when said capacitor discharges;
  - an induction coil responsive to the surge, connected in series to one end of said capacitor, for generating the electrodynamic force applied to said mobile contact bridge means; and
  - means, connected to the other end of said capacitor and the other end of said induction coil, for detecting when the defect current reaches a threshold value and for providing a path of less impedance for an excess of the surge of current.

13. A circuit breaker according to claim 12, wherein said means connected to said capacitor and said induction coil comprises:
  - a thyristor connected to and in series with the other end of said induction coil; and
  - a diode connected in parallel with said capacitor, said induction coil and said thyristor whereby the circuit breaker is responsive to a defect current that is unidirectional.

14. A circuit breaker according to claim 12, wherein said means connected to said capacitor and said induction coil comprises:
  - a first thyristor;
  - a diode in a parallel connection with said first thyristor; and
  - a second thyristor connected in parallel with said first thyristor, said capacitor, said diode and said induction coil.

* * * * *